(12) United States Patent
Joshi et al.

(10) Patent No.: US 8,311,986 B2
(45) Date of Patent: Nov. 13, 2012

(54) DETERMINING DATABASE RECORD CONTENT CHANGES

(75) Inventors: Dhanesh Joshi, Cupertino, CA (US); Amol Tasgaonkar, Sunnyvale, CA (US)

(73) Assignee: Mimosa Systems, Inc., Santa Clara, CA (US)

(*) Notice: Subject to any disclaimer, the term of this patent is extended or adjusted under 35 U.S.C. 154(b) by 159 days.

(21) Appl. No.: 12/883,788

(22) Filed: Sep. 16, 2010

(65) Prior Publication Data

US 2012/0072394 A1 Mar. 22, 2012

(51) Int. Cl.
*G06F 7/00* (2006.01)
*G06F 17/00* (2006.01)

(52) U.S. Cl. ........ 707/640; 707/692; 707/796; 711/161; 711/162

(58) Field of Classification Search .......... 707/648, 707/E17.005, 661, 640, 672, 645, 682, 692, 707/796; 711/161, 162
See application file for complete search history.

(56) References Cited

U.S. PATENT DOCUMENTS

| | | | | | |
|---|---|---|---|---|---|
| 5,978,842 | A | * | 11/1999 | Noble et al. | 707/E17.116 |
| 5,983,268 | A | * | 11/1999 | Freivald et al. | 707/E17.116 |
| 6,035,412 | A | * | 3/2000 | Tamer et al. | 707/999.204 |
| 6,421,670 | B1 | * | 7/2002 | Fourman | 707/E17.005 |
| 7,051,050 | B2 | * | 5/2006 | Chen et al. | 707/679 |
| 2003/0208511 | A1 | * | 11/2003 | Earl et al. | 707/204 |
| 2006/0047715 | A1 | * | 3/2006 | Parizeau | 707/203 |
| 2007/0083530 | A1 | * | 4/2007 | Lakshminath et al. | 707/100 |
| 2007/0156781 | A1 | * | 7/2007 | Kapoor et al. | 707/202 |
| 2007/0156792 | A1 | * | 7/2007 | D'Souza et al. | 707/204 |
| 2007/0168401 | A1 | * | 7/2007 | Kapoor et al. | 707/202 |
| 2007/0174690 | A1 | * | 7/2007 | Kambara et al. | 714/13 |
| 2008/0028009 | A1 | * | 1/2008 | Ngo | 707/204 |
| 2008/0201390 | A1 | * | 8/2008 | Anguelov | 707/204 |
| 2009/0248753 | A1 | * | 10/2009 | Tsai et al. | 707/202 |
| 2012/0011392 | A1 | * | 1/2012 | Hatasaki et al. | 714/4.11 |

OTHER PUBLICATIONS

Erhard Rahm—"Recovery concepts for data sharing systems"—This paper appears in: Fault-Tolerant Computing, 1991. FTCS-21. Digest of Papers., Twenty-First International Symposium—Date of Conference: Jun. 25-27, 1991—(pp. 368-375).*

Bernard Pope & Lee Naish—"Practical aspects of declarative debugging in Haskell 98"—Proceeding PPDP '03 Proceedings of the 5th ACM SIGPLAN international conference on Principles and practice of declaritive programming—Aug. 27-29, 2003—(pp. 230-240).*

* cited by examiner

*Primary Examiner* — Anh Ly

(57) ABSTRACT

Database backup system identifies and extracts any changed database record using only two copies of the database from two different points in time. A first copy of the database is generated at a first time. Copies of log files including changes to the database since the first time are generated at a second time. The copy of the log files is applied to the database copy, and any changed blocks of the first copy of the database are identified. The changed blocks and a second copy of the database are used to identify changes to any record of the database between the first and second time. An archived database is generated and updated over time by archiving only data of any record that subsequently changes. Restoration of the database to a state corresponding to any point in time uses only the archived database and data of changed data records.

33 Claims, 4 Drawing Sheets

DETERMINING DATABASE RECORD CONTENT CHANGES

TECHNICAL FIELD

Embodiments are described relating to systems and methods for managing electronic content and, more particularly, efficiently determining changes in electronic content between two images in a database.

BACKGROUND

Bulk backup of data or databases involves copying an entire database file and any corresponding log files to a backup location, and this type of backup is relatively efficient. When conventional bulk backup methods are used, the resulting set of files represents the database at a point in time at which the backup was performed. Through the use of log files, changes to the database as a whole between two points in time can be efficiently represented, and the database as a whole can be restored to some previous point in time at which the backup was created.

These bulk backup methods, however, provide no useful way to understand fine-grained changes to individual database records. The bulk backup makes no provision for restoring only selected content to a previous point in time, and no provision for identifying changed content for archiving or analysis of only the content that changed. Many databases provide a separate, content-oriented interface for this specific purpose, but these interfaces are not efficient, and often impractical for use in protection and analysis of the entire database. This is especially problematic when the database is an electronic mail (email) database used as an email store, because the ability to conduct analysis, archiving, and restoration of individual emails becomes a necessary capability in the email database.

DETAILED DESCRIPTION

Systems and methods for identifying changed content in a database are described herein. The systems and methods, collectively referred to herein as the database backup system, identifies and extracts any changed record of the database using only two copies of the database made at two different points in time. In so doing, the database backup system generates a first copy of the database at a first time. Log files existing at the first time are applied to the first copy, and a second copy of the database is generated. Copies of log files that include changes to the database since the first time are generated at a second time. The database backup system applies the contents of the copy of the log files persistently to the first copy of the database, and identifies any changed blocks of the first copy of the database that result from application of the copy of the log files. The database backup system uses data of the changed blocks and the first copy and second copy of the database to identify changes to any record of the database that has changed between the first time and the second time. Thus, the system of an embodiment provides a relatively efficient method of extracting changed content (database records) given only the bulk images of a database at two points in time.

Because the database backup system can identify changed data at the level of individual data records, it is used in an embodiment to generate an archived database by archiving the database, and updating the archived database over time by archiving only data of any record that changes subsequent to the generating of the archived database. Furthermore, the database backup system enables restoration of the database to a state corresponding to any point in time using only the archived database and data of the changed data records.

Figure 1:
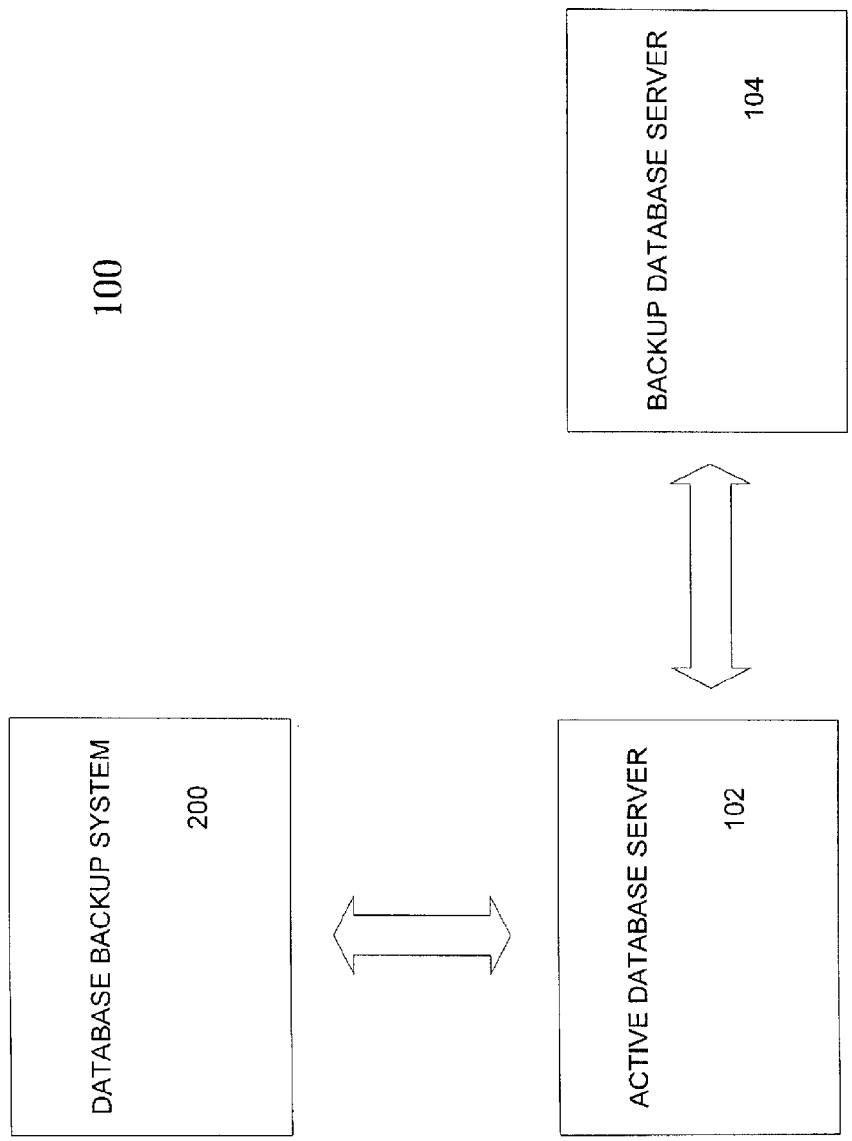
FIG. 1 is a block diagram of a system for identifying changed content in a database, under an embodiment.

FIG. 1 is a block diagram of a system for identifying changed content in a database 100, under an embodiment. The system 100 comprises an active database server 102 (also referred to as an active server 102) and/or other processor-based device coupled or connected to a backup database server 104 (also referred to as a backup server 104). In an embodiment, the database backup system 200 is coupled or connected to the active database server 102. Alternatively, the database backup system 200 can be coupled or connected to backup database server 104. In yet another alternative embodiment, the database backup system 200 is coupled or connected to the active database server 102 and the backup database server 104. Regardless of coupling or connecting configuration, the contents of the active database server 102 comprising documents and/or other electronic content (e.g., electronic mail, etc.) described herein are processed by the database backup system 200 for backup or archiving in the backup database server 104, as described in detail below.

Figure 2:
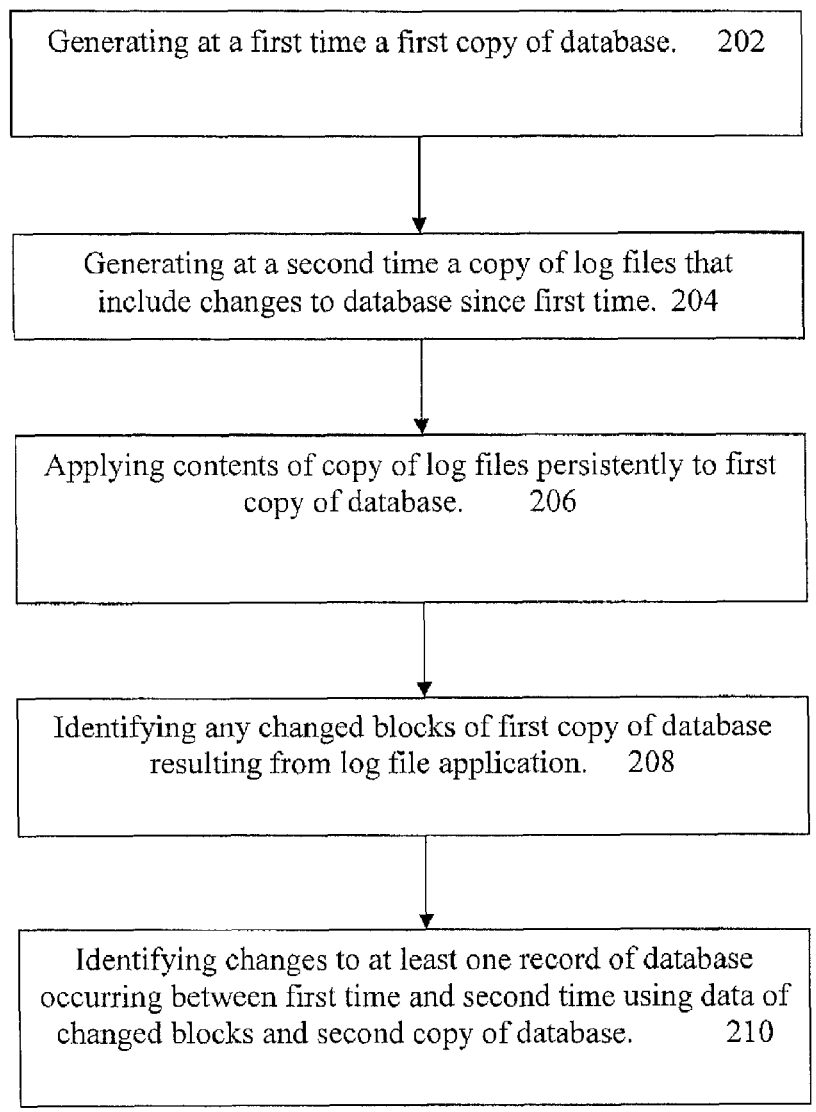
FIG. 2 is a flow diagram for identifying changes to a database, under an embodiment.

Generally, FIG. 2 is a flow diagram for identifying changes to a database 200, under an embodiment. The database backup system generates at a first time a first copy of the database 202. At a second time, a copy of log files is generated that includes changes to the database since the first time 204. The system applies contents of the copy of the log files persistently to the first copy of the database 206. Any changed blocks of the first copy of the database resulting from the application of the log file contents are identified 208. The backup database system identifies any changed record of the database occurring between the first time and the second time using data of the changed blocks and a second copy of the database 210.

Figure 3:
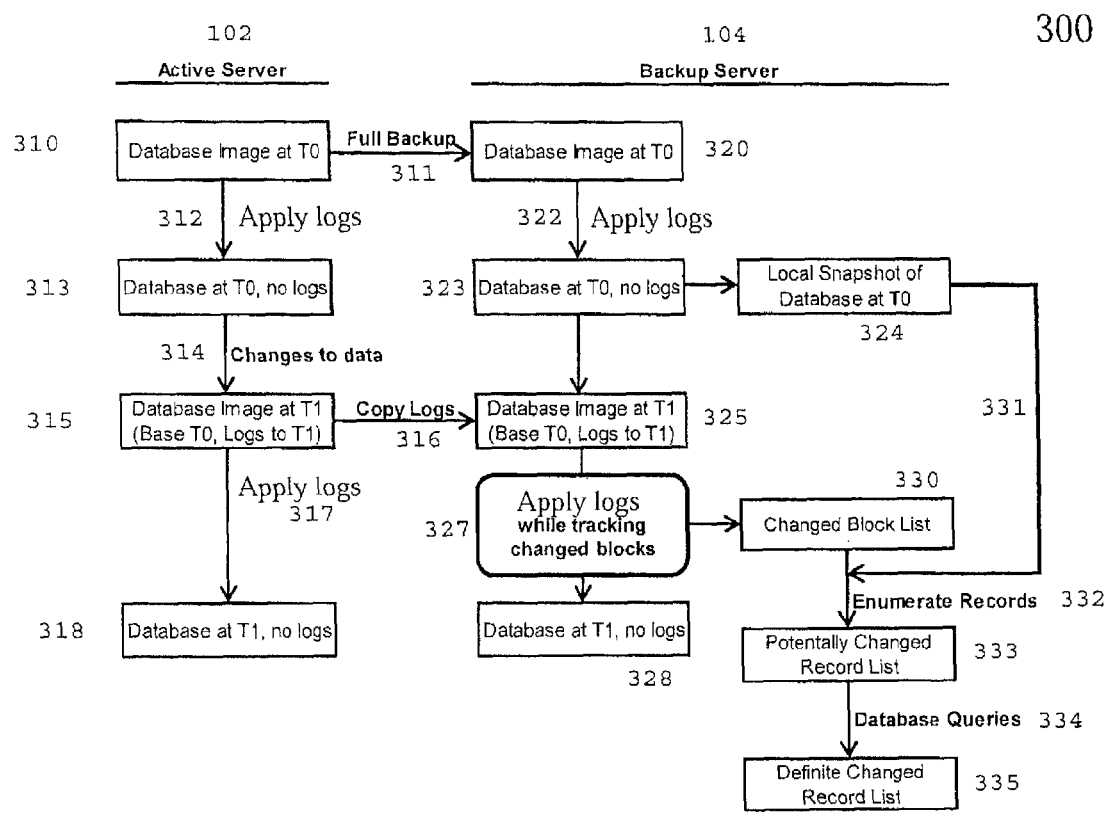
FIG. 3 is a flow diagram for identifying changes to a database and generating a change record or file that includes information of the changes, under an embodiment.

More specifically, FIG. 3 is a flow diagram under which the database backup system 200 identifies changes to a database and generates a change record or file that includes information of the changes 300, under an embodiment. As described above, the database backup system 200 is coupled or connected to at least one of the active server 102 and the backup server 104. The database backup system 200 of an embodiment comprises an application running under a processor. As such, the database backup system 200 identifies changes to a database 310 of the active database server by generating 311 at a first time T0 a first copy 320 (e.g., full backup copy) of the database. Generation of the first copy 320 of the database includes generating a first copy of log files corresponding to the first copy of the database. The database and the log files are hosted on the active server 102, and the first copy of the database and the first copy of the log files 320 are transferred to the backup database server 104 where they are stored.

Contents of the log files are applied 312 to the database so that the database changes represented by contents of the log files are applied to generate an updated database 313, and the log files are emptied. Application 322 of the log files also includes applying contents of the first copy of the log files to the first copy of the database so that the database changes represented by contents of the copy of the log files are applied to generate an updated copy of the database 323, and the log files are emptied. A second copy 324 of the database is generated, following the application of the log files, to preserve a state of the database at the first time T0. The second copy of the database is hosted on the backup database server 104.

The database backup system generates, at a second time T1, a copy of log files 316 that include changes 314 to the database since the first time T0. Thus, a database image 315 on the active server 102 at the second time T1 comprises the database at the first time T0 along with the log files representing changes 314 to the database since the first time T0. Likewise, a database image 325 on the backup server 104 at the second time T1 comprises the copy of the database at the first time T0 along with the copy of the log files 316 representing changes to the copy of the database since the first time T0.

Content of the log files are applied 317 to the database (at time T1) so that the database changes (since time T0) represented by contents of the log files 314 are applied to generate an updated database 318, and the log files are emptied. Application 327 of the log files also includes applying contents of the copy of the log files 316 persistently to the first copy of the database (at time T1) so that the database changes (since time T0) represented by contents of the copy of the log files 316 are applied to generate an updated database 328, and the copy of the log files are emptied.

Applying 327 the copy of the log files 316 also includes identifying any changed blocks of the first copy of the database resulting from the application of the log files. The database backup system generates a change file 330 including information of the changed blocks, and identifies changes to any record of the database occurring between the first time T0 and the second time T1 using data of the changed blocks and the second copy 324 of the database.

The database backup system identifies changes to one or more records of the database by comparing 331 the second copy 324 of the database and contents of the change file 330. The comparison enumerates 332 the changed block list to generate a list of potentially changed records 333. Enumeration 332 of the records involves the determination of a record boundary for each record in a set of records that form each changed block included in the list. Enumeration 332 also includes the determination of a unique key for each record in the set of records. Generation of the second copy of the database, as described above, can comprise identification of any changed blocks.

Using the list of potentially changed records 333, the database backup system performs database queries 334 to identify changed records of the database. The database queries 334 include a first query of the database in a state that corresponds to the first time, and a second query of the database in a state that corresponds to the second time. Each of the first query and the second query uses the record boundary and the unique key of each record in the set of records. Results of the first query and the second query are compared and identification of exact differences in content 335 of each record of the set of records results from the comparison.

Figure 4:
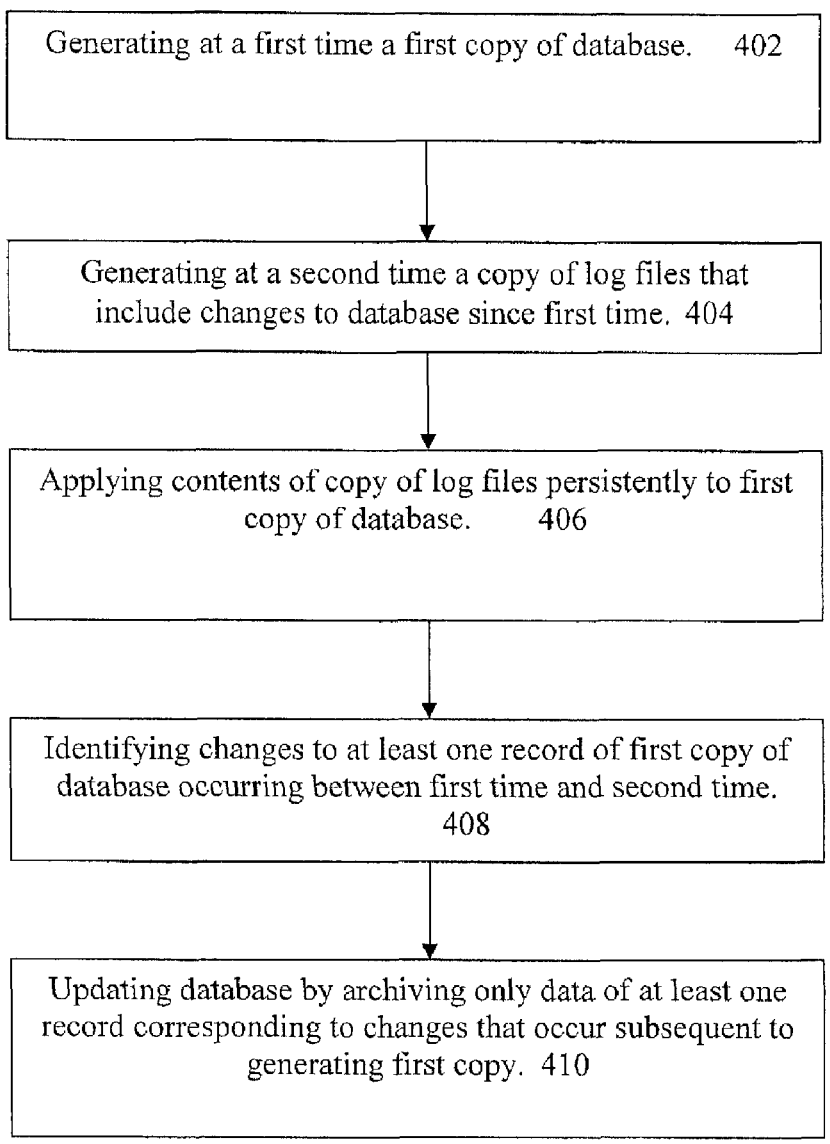
FIG. 4 is a flow diagram for updating a database archive to include changes to the database since a previous time, under an embodiment.

As an example of use of the backup system of an embodiment in archiving, FIG. 4 is a flow diagram for updating a database archive to include changes to the database since a previous time 400, under an embodiment. The database backup system generates at a first time a first copy of the database 402. At a second time, a copy of log files is generated that include changes to the database since the first time 404. The contents of the copy of the log files are applied to the first copy of the database 406. Changes to at least one record of the first copy of the database are identified that occurred between the first time and the second time 408. The database is archived by archiving only data of the at least one record corresponding to the changes that occur subsequent to the generating of the first copy 410.

The system of an embodiment, as described above, provides a relatively efficient method of extracting changed content (database records) given only the bulk images of a database at two points in time. Because the database backup system can identify changed data at the level of individual data records, it is used to generate an archived database by archiving the database, and updating the archived database over time by archiving only data of any record that changes subsequent to the generating of the archived database. Furthermore, the database backup system enables restoration of the database to a state corresponding to any point in time using only the archived database and data of the changed data records.

In the description above, numerous specific details are introduced to provide a thorough understanding of, and enabling description for, embodiments of the database backup. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the database backup is not intended to be exhaustive or to limit the systems and methods described to the precise form disclosed. While specific embodiments of and examples for, the database backup are described herein for illustrative purposes, various equivalent modifications are possible within the scope of other systems and methods, as those skilled in the relevant art will recognize. The teachings of the database backup provided herein can be applied to other processing systems and methods, not only for the systems and methods described above.

The elements and acts of the various embodiments described above can be combined to provide further embodiments. These and other changes can be made to the database backup in light of the above detailed description.

The elements and acts of the various embodiments described above can be combined to provide further embodiments. These and other changes can be made to the embodiments described above in light of the above detailed description.

In general, in the following claims, the terms used should not be construed to limit the embodiments described above to the specific embodiments disclosed in the specification and the claims, but should be construed to include all systems that operate under the claims. Accordingly, the embodiments described above are not limited by the disclosure, but instead the scope is to be determined entirely by the claims.

While certain aspects of the embodiments described above are presented below in certain claim forms, the inventors contemplate the various aspects of the embodiments described above in any number of claim forms. Accordingly, the inventors reserve the right to add additional claims after filing the application to pursue such additional claim forms for other aspects of the embodiments described above.

What is claimed is:

1. A computer-implemented method running under a processor for identifying changes to a database, the method comprising:

generating at a first time a first copy of the database;
generating at a second time a copy of log files that include changes to the database since the first time;
applying contents of the copy of the log files persistently to the first copy of the database;
identifying any changed blocks of the first copy of the database resulting from the application of the copy of the log files; and
identifying changes to at least one record of the database occurring between the first time and the second time using data of the changed blocks and a second copy of the database, the identifying changes to the at least one record comprising extracting a changed record of the database using only two copies of the database made at two different points in time comprising the first time and the second time.

2. The method of claim 1, wherein the generating of the first copy of the database comprises generating a first copy of log files corresponding to the first copy of the database.

3. The method of claim 2, comprising applying the log files by:

applying contents of the log files to the database;
applying contents of the first copy of the log files to the first copy of the database.

4. The method of claim 3, comprising, following the application of the log files, generating the second copy of the database, wherein the second copy of the database preserves a state of the database at the first time.

5. The method of claim 1, comprising, at the second time, applying contents of the log files to the database.

6. The method of claim 1, comprising generating a change file including information of the changed blocks.

7. The method of claim 6, wherein the identifying changes to the at least one record comprises:

comparing the second copy of the database and contents of the change file;
determining a record boundary for each record in a set of records that form each changed block.

8. The method of claim 7, comprising determining a unique key for each record in the set of records.

9. The method of claim 8, comprising performing a first query of the database corresponding to the first time, wherein the first query uses the record boundary and the unique key of each record in the set of records in performing the first query on the set of records.

10. The method of claim 9, comprising performing a second query of the database corresponding to the second time, wherein the second query uses the record boundary and the unique key of each record in the set of records in performing the second query on the set of records.

11. The method of claim 10, comprising comparing results of the first query and the second query and determining exact differences in content of each record of the set of records.

12. The method of claim 1, wherein the generating of the second copy of the database comprises the identifying any changed blocks.

13. The method of claim 1, comprising:

generating an archived database by archiving the database;
updating the archived database by archiving only data of the at least one record corresponding to the changes that occur subsequent to the generating of the archived database.

14. The method of claim 13, comprising, at a future time that follows the second time, restoring the database to a state corresponding to a third time that is between the second time and the future time, the restoring using only the archived database and data of the at least one record corresponding to the changes that occur between the second time and the third time.

15. A system comprising:
an active database server coupled to a backup database server; and
an application running under the active database server, the application identifying changes to a database of the active database server by:
generating at a first time a first copy of the database;
generating at a second time a copy of log files that include changes to the database since the first time;
applying contents of the copy of the log files persistently to the first copy of the database;
identifying any changed blocks of the first copy of the database resulting from the application of the copy of the log files; and
identifying changes to at least one record of the database occurring between the first time and the second time using data of the changed blocks and a second copy of the database, the identifying of changes to the at least one record comprising extracting a changed record of the database using only two copies of the database made at two different points in time comprising the first time and the second time.

16. The system of claim 15, wherein the generating of the first copy of the database comprises generating a first copy of log files corresponding to the first copy of the database.

17. The system of claim 16, wherein the database and the log files are hosted on the active database server.

18. The system of claim 17, comprising transferring the first copy of the database and the first copy of the log files to the backup database server.

19. The system of claim 18, wherein the second copy of the database is hosted on the backup database server.

20. The system of claim 16, comprising applying the log files by:
applying contents of the log files to the database;
applying contents of the first copy of the log files to the first copy of the database.

21. The system of claim 20, comprising, following the application of the log files, generating the second copy of the database, wherein the second copy of the database preserves a state of the database at the first time.

22. The system of claim 15, comprising generating the copy of the log files at the active database server and transferring the copy of the log files to the backup database server.

23. The system of claim 15, comprising, at the second time, applying contents of the log files to the database.

24. The system of claim 15, comprising generating a change file including information of the changed blocks.

25. The system of claim 24, wherein the identifying changes to the at least one record comprises:
comparing the second copy of the database and contents of the change file;
determining a record boundary for each record in a set of records that form each changed block.

26. The system of claim 25, comprising determining a unique key for each record in the set of records.

27. The system of claim 26, comprising performing a first query of the database corresponding to the first time, wherein the first query uses the record boundary and the unique key of each record in the set of records in performing the first query on the set of records.

28. The system of claim 27, comprising performing a second query of the database corresponding to the second time, wherein the second query uses the record boundary and the unique key of each record in the set of records in performing the second query on the set of records.

29. The system of claim 28, comprising comparing results of the first query and the second query and determining exact differences in content of each record of the set of records.

30. The system of claim 15, wherein the generating of the second copy of the database comprises the identifying any changed blocks.

31. The system of claim 15, comprising:
generating an archived database by archiving the database;
updating the archived database by archiving only data of the at least one record corresponding to the changes that occur subsequent to the generating of the archived database.

32. The system of claim 31, comprising, at a future time that follows the second time, restoring the database to a state corresponding to a third time that is between the second time and the future time, the restoring using only the archived database and data of the at least one record corresponding to the changes that occur between the second time and the third time.

33. A computer implemented method running under a processor, the method comprising:
generating at a first time a first copy of a database;
generating at a second time a copy of log files that include changes to the database since the first time;
applying contents of the copy of the log files to the first copy of the database;
identifying changes to at least one record of the first copy of the database occurring between the first time and the second time, the identifying of changes to the at least one record comprising extracting a changed record of the database using only two copies of the database made at two different points in time comprising the first time and the second time; and
updating the database by archiving only data of the at least one record corresponding to the changes that occur subsequent to the generating of the first copy.

* * * * *